United States Patent [19]

Ogata et al.

[11] Patent Number: 4,761,262
[45] Date of Patent: Aug. 2, 1988

[54] SINTERING METHOD

[75] Inventors: Masaru Ogata, Hadano; Shuichi Takeda, Oiso, both of Japan

[73] Assignee: Kabushiki Kaisha Komatsu Seisakusho, Tokyo, Japan

[21] Appl. No.: 928,220
[22] PCT Filed: Feb. 14, 1986
[86] PCT No.: PCT/JP86/00069
§ 371 Date: Oct. 8, 1986
§ 102(e) Date: Oct. 8, 1986
[87] PCT Pub. No.: WO86/04890
PCT Pub. Date: Aug. 28, 1986

[30] Foreign Application Priority Data

Feb. 15, 1985 [JP] Japan ................................ 60-026424

[51] Int. Cl.[4] .................................................. B22F 1/00
[52] U.S. Cl. ......................................... 419/10; 419/23; 419/42; 419/46; 419/48; 419/68; 264/65; 264/125
[58] Field of Search .................... 419/42, 46, 68, 48, 419/23, 10; 264/125, 332, 65

[56] References Cited

U.S. PATENT DOCUMENTS

| | | | |
|---|---|---|---|
| 3,865,573 | 2/1975 | Newmann | 75/84 |
| 3,909,909 | 10/1975 | Whalen et al. | 419/23 |
| 3,999,952 | 12/1976 | Kondo et al. | 419/12 |
| 4,610,726 | 9/1986 | King | 419/12 |
| 4,655,830 | 4/1987 | Akashi et al. | 419/45 |

FOREIGN PATENT DOCUMENTS 36-23463 12/1961 Japan.
60-54272 11/1985 Japan.

Primary Examiner—Stephen J. Lechert, Jr.
Attorney, Agent, or Firm—Armstrong, Nikaido, Marmelstein & Kubovcik

[57] ABSTRACT

A method for sintering a metal powder, a ceramic powder, or a mixture thereof accomplishes compact sintering of even a high melting substance by heating the powder at an elevated temperature for a short time under not less than 10,000 atmospheres of pressure. To attain the quick high-temperature heating under the ultrahigh pressure, a Thermit reaction is generated in an ultrahigh pressure generating apparatus which is provided with a gasket made of pyrophyllite and cylinders and anvils protected with heat insulators.

For the purpose of preventing the Thermit reaction from inducing a reaction between the Thermit composition and the powder under treatment and the heater and ensuring electrical insulation of these components, barriers made of hexagonal boron nitride and/or tantalum are suitably disposed within the apparatus.

9 Claims, 1 Drawing Sheet

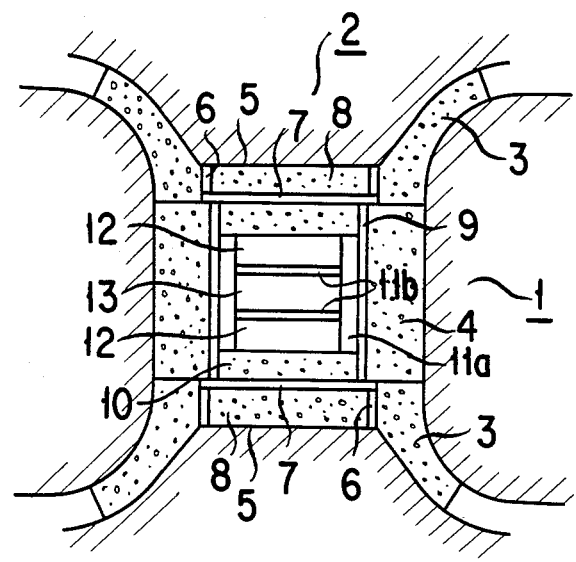

SINTERING METHOD

TECHNICAL FIELD OF THE INVENTION

This invention relates to a method for the sintering a metal powder, a ceramic powder, or a mixture of a metal powder with a ceramic powder, and more particularly to a sintering method which comprises heating the aforementioned powder by means of Thermit reaction while keeping the powder under pressure.

BACKGROUND OF THE INVENTION

The so-called sintering method which uses a powder as a starting material and converts it into a mass by sintering has heretofore been widely used on metals, ceramics, and composite materials thereof.

The largest task imposed on the sintering method consists in obtaining a mass which is compact and is formed of minute crystal grains. For promoting compaction, pressure sintering methods resorting as to a hot press and a hot hydrostatic press are available. They use pressures on the order of 500 atmospheres and 2,000 atmospheres respectively. For the heating to be made under a still higher pressure, it is necessary to use such an apparatus for the generation of ultrahigh pressure and high temperature as disclosed in Japanese Patent Publication SHO 36(1961)-23,463, for example. With this apparatus, sintering can be carried out under not less than 10,000 atmospheres of pressure.

For example, a method which obtains a sintered article having a compact and fine texture by sintering an alloy powder or a nonequilibrium phase under not less than 10,000 atmospheres of pressure is conceivable.

The problems encountered by the ultrahigh pressure sintering method are as follows:

1. Since this method uses a solid pressure medium, the apparatus is deficient in capacity for hydrostatic pressure and the sintered article assumes anisotropy.

2. Since a heater installed outside the material under treatment or resistance heating caused by passage of electricity to the material under treatment itself is utilized for the heating, the apparatus requires a power source of a large capacity.

3. Since no suitable substance is available for an electrically insulating refractory material, the heating at an elevated temperature exceeding 2,000° C. is not easily attained.

4. Since the speed of heating is slow, diffusion occurs and crystal grains are coarsened during the course of temperature elevation.

DISCLOSURE OF THE INVENTION

This invention has been perfected in view of the state of affairs mentioned above. An object of the invention is to provide, for elimination of disadvantages of the prior art, a method for sintering a metal powder, a ceramic powder, or a mixture thereof which attains intimate sintering of even a high melting substance by carrying out a high-temperature heating under ultrahigh pressure for a short time.

Another object of this invention is to provide a sintering method which comprises heating a metal powder, a ceramic powder, or a mixture thereof as kept under pressure with the heat of a Thermit reaction.

Yet another object of this invention is to provide a method for sintering a metal powder, a ceramic powder, or a mixture thereof, wherein the sintered article to be produced is protected so as not to be corroded by the product of Thermit reaction.

To attain the objects described above, the first embodiment of this invention provides a method for sintering a metal powder, a ceramic powder, or a mixture thereof by heating the aforementioned powder or mixture as held under pressure with the heat of Thermit reaction.

The second embodiment of this invention provides a sintering method set forth in the first embodiment mentioned above, which further comprises interposing a barrier made of hexagonal boron nitride and/or tantalum between the powder subjected to sintering and a Thermit composition.

The third embodiment of this invention provides a sintering method set forth in the first embodiment mentioned above, which further comprises disposing a Thermit composition around the entire periphery of the powder subjected to sintering, heating the powder with the heat generated by the Thermit reaction and, at the same time, fusing a part or the whole of the product of the Thermit reaction thereby hydrostatically applying pressure on the powder.

The fourth embodiment of this invention provides a sintering method set forth in any of the first through third embodiments mentioned above, wherein the Thermit composition is a mixture of iron oxide powder with aluminum powder, a mixture of iron oxide powder with silicon powder, or a mixture of iron oxide powder with aluminum powder and silicon powder.

The fifth embodiment of this invention is a sintering method set forth in the first embodiment mentioned above, wherein the pressure resulting from the Thermit reaction is not less than 10,000 atmospheres.

The sixth embodiment of this invention provides a sintering method set forth in any of the first through fifth embodiments mentioned above, wherein the powder subjected to sintering is one member or a mixture of at least two members selected from among $TiB_2$, $ZrB_2$, and $HfB_2$, or one member or a mixture of at least two members selected from among the compounds based on the aforementioned borides.

The seventh embodiment of this invention provides a sintering method set forth in the first embodiment mentioned above, wherein the powder subjected to sintering has a grain size of not more than 1 μm.

The eighth embodiment of this invention provides a sintering method set forth in the first embodiment described above, wherein the powder of one member or a mixture of at least two members selected from among $TiB_2$, $ZrB_2$, and $HfB_2$ is sintered as held under pressure with the heat of the reaction of a Thermit composition to produce a heat-resistant, abrasion-resistant, electroconductive, and neutron-shielding high-density sintered article.

The ninth embodiment of this invention provides a sintering method set forth in the eighth embodiment mentioned above, wherein the pressure resulting from the Thermit reaction is not less than 10,000 atmospheres.

BRIEF DESCRIPTION OF THE DRAWING

The accompanying drawing is a partially cutaway schematic longitudinal cross section illustrating the layout of an assembly in an ultrahigh pressure apparatus as a typical means of accomplishing the sintering method of this invention.

DESCRIPTION OF PREFERRED EMBODIMENT OF THE INVENTION

In the ultrahigh pressure sintering method of this invention, the so-called Thermit reaction, i.e. a chemical reaction that generates the heat capable of accomplishing quick high-temperature heating, is utilized.

For example, when a mixture having a composition of 1 mol of $Fe_2O_3$ powder and 1 mol of Al powder is ignited, the following reaction is completed in less than 1 second with quick emission of 204 Kcal of heat.

$$Fe_2O_3 + 2Al \rightarrow Al_2O_3 + 2Fe$$

By disposing a Thermit composition around the periphery of a powder subjected to sintering, the powder can be heated in an extremely short time. Further, by the reaction, the Thermit composition is fused to cause hydrostatic application of pressure on the powder. Moreover, since the heating is completed in an extremely small time, the refractory used for retaining the Thermit composition can withstand the high-temperature heating which is never realized by the conventional resistance heating. The heating temperature can be adjusted by varying the charging amount, the percentage composition, or the kind of the Thermit composition. As the reducing metal powder, the powder of Si, Ti, Mg, or Ca, for example, can be used instead of that of Al.

Further, FeO, $Fe_3O_4$, or other similar oxide having a small free energy of formation can be used in the place of $Fe_2O_3$. The combination of an oxide with a metal is no exclusive requirement. It is permissible to combine a carbide, nitride, or boride powder having a small free energy of formation with a metal powder capable of reducing the powder just mentioned. It should be noted, however, that a composition which produces a large heat from a chemical reaction but which produces a gaseous phase like an explosive cannot be used because it generates a notably high pressure at the same time.

Between the Thermit composition and the powder subjected to sintering, a layer of hexagonal boron nitride, or tantalum, for example, is desired to be interposed for the purpose of preventing the sintered article from being corroded by the product of the Thermit reaction.

The ignition of Thermit is effected by passing electricity to the Thermit composition or to a separately disposed heater thereby heating part or the whole of the Thermit composition.

For example, when a Thermit composition consisting of 1 mol of $Fe_2O_3$ and 2 mols of Al is kept under 20,000 atmospheres of pressure, it is ignited as part thereof is heated to about 830° to 1,000° C.

The sintering method of this invention utilizing the Thermit reaction as described above will be described more specifically below with reference to working examples.

EXAMPLE 1

In a discal die 22 mm in diameter, 7.0 g of $TiB_2$ powder (made by Cerac Inc.) having grain sizes smaller than 325 mesh was cold molded. Two halves of 18.3 g of a Thermit composition prepared by mixing $Fe_2O_3$ powder and Al powder at a molar ratio of 1:2 were cold molded in a die 22 mm in diameter to produce two discs. The $TiB_2$ disc obtained above was interposed between these two discs through the medium of thin layers of hexagonal boron nitride. The resulting assembly was set in place in a belt type ultrahigh pressure generating apparatus. FIG. 1 illustrates the condition of disposition in the ultrahigh pressure generating apparatus. Reference numerals 1, 2 denote a cylinder and an anvil respectively which form an ultrahigh pressure generating vessel. Numeral 3 denotes a gasket made of pyrophyllite and adapted to seal in pressure. Numeral 4 denotes a heat insulator made of pyrophyllite. A copper plate 5, a ring 6 made of steel, a steel plate (or molybdenum plate) 7, and a ceramic heat insualtor 8 jointly form an assembly for feeding electricity to a cylindrical graphite heater 9. A heat insualtor 10 made of pyrophyllite and a cylinder 11a and a thin plate 10b both made of hexagonal boron nitride and/or tantalum function to prevent a Thermit composition 12 from reacting with a heater and a powder ($TiB_2$) 13 subjected to sintering and provide electric insulation for the Thermit composition 12.

When a load was applied on one of the anvils to generate 20,000 atmospheres of pressure in a sample chamber and electricity was passed from the other anvil to the heater to heat the sample chamber, the Thermit composition was spontaneously ignited at the time that the temperature of the sample chamber reached 920° C. The ignition of Thermit can be easily detected by a decrease of electric resistance due to a sharp rise of temperature because the temperature coefficient of electric resistance of the graphite heater is a negative number. The ignition can also be detected by a decrease of distance between the anvils due to ignition of Thermit.

Immediately after the ignition, the heating with the heater was stopped and the powder subjected to sintering was heated with the heat of Thermit reaction. The amount of heat generated by Thermit in this example was about 18 Kcal. Based on various thermodynamic data known in the art, the highest temperaute reached in the sample chamber is estimated to be 2,590° C. The Thermit reaction completed itself in less than 1 second. The sample part was left standing under the existing pressure for 5 minutes, then cooled, relieved of the pressure, and opened to permit recovery of $TiB_2$.

The former $TiB_2$ powder was already converted into a perfectly compact sintered article, which was found to have a relative density of not less than 99% as measured by the Archimedean method. None of the sintered articles of pure $TiB_2$ so far produced has acquired such a high compactness as this.

EXAMPLE 2

It was confirmed by an electroconductivity test that the sintered article of $TiB_2$ obtained in Example 1 was a specific ceramic piece exhibiting the same degree of electroconductivity as a metal. It was readily fabricable by electron discharge cutting.

This sintered article was extremely hard, exhibiting a Knoop hardness of 4,100 kg/mm², and could easily inflict a scratch on hard metal.

EXAMPLE 3

A test was conducted by following the procedure of Example 1, except that the amount of the Thermit composition was changed to 36.7 g and the pressure to 10,000 atmospheres. The amount of heat generated by the Thermit reaction was about 35 Kcal, supporting an estimate that the heating proceeded to a temperature exceeding the melting point of $TiB_2$ (2,980° C. by the known data). In this example, too, the $TiB_2$ powder was converted into a compact sintered article.

When a specimen of the sintered article was examined under an optical microscope with respect to crystal grain diameter, the grains were found to have grown to average diameters of 100 to 200 μm. Since the grains in the starting material had diameters of about 10 μm, these large average diameters justify a conclusion that the heating proceeded to an extremely high temperature.

EXAMPLE 4

By faithfully following the procedure of Example 1, 20.0 g of $HfB_2$ powder (made by Cerac Inc.) having grain sizes of not more than 325 mesh was subjected to a sintering test. Consequently, the $HfB_2$ was converted into a compact sintered article, which exhibited a satisfactory electroconductivity. It was confirmed to possess high hardness enough to inflict a scratch on hard metal.

EXAMPLE 5

A sintering test was carried out by following the procedure of Example 1, except that 11.3 g of $ZrB_2$ powder (made by Cerac Inc.) having grain sizes of not more than 325 mesh and 24 g of a Thermit composition consisting of $Fe_2O_3$ and Al in a molar ratio of $\frac{1}{2}$ were used instead. In this example, the amount of heat generated by the reaction was about 23 Kcal, supporting an estimate that the highest temperature reached by the sample part was 2,640° C.

In this example, too, the $ZrB_2$ ws converted into a compact sintered article having a gray metallic gloss. It was a good conductor of electricity. This sintered article had a fine texture showing no sign of crystal grain growth and possessed high hardness enough to inflict readily a scratch on hard metal.

EXAMPLE 6

From the sintered article obtained in Example 5, a bar 1.5 mm in thickness, 3 mm in width, and 20 mm in length was cut by the use of an NC type wire cutting device adopting the principle of electron discharge cutting. This cutting was as easy as in wire cutting of hard metal. The cut surface was flat and smooth.

As compared with the conventional ceramics such as, for example, $Al_2O_3$, $ZrO_2$, and $Si_3N_4$ which are electric insulators and, therefore, must be worked and cut with diamond, the present sintered article excels in electron discharge machinability. In this respect the sintered article proves highly useful commercially.

When the aforementioned $ZrB_2$ bar was heated to the red- to white-hot condition, it sustained no discernible change, supporting a conclusion that the bar excelled in resistance to heat and resistance to oxidation.

EXAMPLE 7

In a die, 1.6 g of $Si_3N_4$ (made by C'Starck f.r.g.) having an average grain size of about 0.5 μm and an α crystallization ratio of 90% was cold molded in the shape of a disc 12.8 mm in diameter and 7.2 mm in height. This disc was enclosed on the upper and lower sides and the lateral side with a tantalum sheet 0.1 mm in thickness and was further enclosed, through the medium of hexagonal boron nitride, with 10.1 g of a Thermit composition consisting of $Fe_2O_3$ and Al in a rolar ratio of $\frac{1}{2}$. The resulting assembly was set in place in the same ultrahigh pressure apparatus as illustrated in FIG. 1. The pressure inside was raised to 10,000 atmospheres and the Thermit was ignited. In the present example, the amount of heat of the Thermit reaction was 10 Kcal.

The sintered article consequently obtained was a compact disc 11.7 mm in diameter, indicating that the molded powder had shrunken in the radial direction. Generally in the belt type ultrahigh pressure apparatus, since the pressure is exerted by the vertically opposed anvils, the material under treatment slightly expands from its original diameter in the radial direction perpendicular to the direction of pressure application. The radial shrinkage observed in the radial direction implies that the Thermit composition disposed around the periphery of the disc was fused by ignition and allowed to exert hydrostatic pressure. The sintered article consequently obtained had a relative density of not less than 97%. By an X-ray diffraction, this sintered article was found to have undergone thorough phase transformation to β crystals.

EXAMPLE 8

A test was carried out by faithfully following the procedure of Example 1, except that the amount of the Thermit composition was doubled. Consequently, there was obtained a sintered article having a relative density of not less than 97%. An X-ray diffraction of a cross section of this sintered article revealed occurrence of a β phase and an α phase both in fairly high percentages. The α phase is a stable structure at low temperatures and the β phase at high temperatures. The occurrence of these two phases indicates that although the amount of heat generated in this example was larger than in Example 7, the sample part reached a lower temperature. A possible reason for this lower temperature is that because of a notably small thermal conductivity of $Si_3N_4$, the surface temperature of $Si_3N_4$ rose remarkably and the hexagonal boron nitride interposed between the $Si_3N_4$ and the Thermit composition and the surface layer of the $Si_3N_4$ under treatment were decomposed and vaporized to give rise to an adiabatic gaseous phase. The results may imply that when a substance of a low thermal conductivity is sintered by the method of this invention, the dimensions of the sintered article consequently produced have their own limits. Although this fact forms one drawback of the method of this invention, it does not deny the major effect that a sintered article of pure $Si_3N_4$ can be obtained without use of any binding aid.

EXAMPLE 9

A sintering test was carried out under 20,000 atmospheres of pressure, using 9 g of a mixture consisting of 5% by weight of $Y_2O_3$, 3% by weight of $Al_2O_3$, and the balance of $Si_3N_4$ and 96.7 g of a Thermit composition consisting of $Fe_2O_3$ and Al in a molar ratio of $\frac{1}{2}$ as disposed in the same manner as in Example 1. Consequently, there was obtained a sintered disc. The hardness of this disc measured on the surface thereof was 1,950 kg/mm² by the Vickers scale.

$Si_3N_4$ can be sintered under atmospheric pressure by the use of a sintering aid such as $Y_2O_3$, $Al_2O_3$, or MgO. A sintered article of the same composition as used in this example obtained in an atmosphere of nitrogen under 1 atmosphere of pressure at 1,750° C. has a Vickers hardness in the range of 1,300 to 1,400 kg/mm². Comparison shows that the method of this invention notably enhances the hardness. The KIC of the sintered article, as determined by the so-called micro-indentation method which measures toughness at rupture by the length of a crack produced from the corner of a pressure mark inflicted during the Vickers hardness test under a large load, was 1 to 10 MNm$^{-3/2}$, a toughness about twice the toughness, 4.5 to 5.5 MNm$^{-3/2}$, of the sintered article produced under the atmospheric pressure.

When $Si_3N_4$ is sintered in the presence of a sintering aid as in the present example, since the sintering occurs in a liquid phase, crystal grains attain a notable growth. For example, even when the primary grain size of $Si_3N_4$ is 0.5 μm, the $Si_3N_4$ grains of the sintered article attain growth to about 5 to 10 times the original grain size. This is a phenomenon which occurs both under atmospheric pressure and ultrahigh pressure.

When a specimen of the sintered article of $Si_3N_4$ obtained in the present example was observed under an electron microscope, the crystal grains were found to have attained virtually no growth from their original grain size of about 0.5 μm.

The high hardness and the high toughness described above may be ascribable to the effect of the method of this invention manifested in increasing the density beyond the level obtainable by the atmospheric sintering and suppressinggrowth of crystal grains.

EXAMPLE 10

In the apparatus of FIG. 1, 20 g of a high speed steel powder equivalent to JIS SKH 57 was placed at the position 13. As the Thermit composition 12 in the diagram of FIG. 1, 25 g of a composition consisting of $Fe_2O_3$ and Si in a molar ratio of ⅔ was pressed up to 10,000 atmospheres and then heated by passing electricity to a graphite heater. The aforementioned Thermit compostiion was ignited at the time that the temperature of the sample part reached 480° C.

In this example, the amount of heat generated by the Thermit reaction was 16 Kcal. The rate of the reaction was lower than when the Thermit composition used Al. The material under treatment was left standing under the existing pressure for 5 minutes following the ignition and then relieved of the pressure. Consequently, there was obtained a compact sintered article of high speed steel. The relative density of this sintered article was 100%. Thus, by the method of this invention, a compact sintered article of metal can be obtained in a short time.

EXAMPLE 11

In a high-energy ball mill, a ferrite type stainless steel powder composed of 18% by weight of Fe, 2% by weight of Cr, and the balance of Mo and 2% by volume of γ-alumina particles of not more than 0.1 μm were mixed for 20 hours to comminute the ferrite crystal grains to less than 1 μm and effect uniform dispersion of alumina.

In the same apparatus as used in Example 10, 20 g of the resulting mixed powder was positioned, ignited and sintered under 20,000 atmospheres of pressure. In the present example, the graphite heater of Example 10 was not used. Instead, a Fe-Al alloy wire 1 mm in diameter was inserted through the gasket part and part of the circuit thereof was held in contact with the Thermit composition of $Fe_2O_3$ and Si. The ignition was effected by feeding electricity to the Fe-Al alloy wire. The Vickers hardness of the produced sintered article was 860 kg/mm$^2$ in its sintered state, 310 kg/mm$^2$ at an elevated temperature of 800° C., and 720 kg/mm$^2$ after one hour's tempering. Because of the quick heating under ultrahigh pressure, the sintered article was formed of extremely minute crystal grains. When a specimen of the sintered article was observed under an opticalmicroscope at 1,000 magnifications, neither detection of alumina nor measurement of grain size of stainless steel crystals was easily obtained.

As shown above, the method of this invention permits application of high pressure and a high temperature and, therefore, proves highly effective in sintering high melting ceramics and high melting metals which defy sintering by the conventional method. The working examples cited above illustrate only part of the embodiments of this invention. For example, the method of this invention can be used for the production of sintered articles of ceramics based on the oxides of such elements as Al, Mg, Be, Zr, Y, Th, Ti, Hf, Cr, La, Sm, and Er, the nitrides of such elements as Ti, Zr, Hf, V, Nb, Ta, Al, Si, Th, and U, the carbides of such elements as Ti, Zr, Hf, V, Nb, Ta, Si, W, Mo, and Cr, and the borides of such elements as C, Al, V, Nb, Ta, Ti, Zr, Hf, Sc, and Y.

The method is also useful as a means of compactly sintering such high melting metals as W and Mo. Further, since the sintering can be effected quickly under a high pressure, the powder can be sintered without entailing growth of crystal grains.

Thus, it can be applied to sintering of various metals, alloys, and composites of metals with ceramics.

As the result, the method can produce materials highly useful commerically. For example, $TiB_2$, $ZrB_2$, and $HfB_2$ shown in the working examples have never been obtained as high-density sintered articles by the conventional method. Owing to their high hardness, high melting points, high corrosionproofness, and high resistance to oxidation, these sintered articles can be used in heat-resistant materials, corrosionproof materials, abrasion-resistant materials, and cutting tools. Owing to their outstanding electroconductivity and resistance to heat, they can be used in high-temperature heating elements, electric contact materials, and electrode materials. They have a characteristic feature that, owing to satisfactory electroconductivity, they can be machined by electric discharge. Further, since they have large cross section for neutron absorption, they can be utilized as neutron shields in an atomic furnace.

The sintered articles of $Si_3N_4$ are characterized by high hardness and high toughness and, therefore, have a bright prospect of being used as cutting tools of longer service life than the conventional cutting tools. The high speed steel articles and the grain-dispersed stainless steel articles sintered by the method of this invention are excellent materials for tools. The sintered articles of grain-dispersed stainless steel are useful as corrosionproof and erosionproof materials and as heat-resistant materials.

As described above, the method of this invention can be applied to sintering of substantially all materials and can produce commercially useful materials.

In working the present invention, the pressure is desired to be as high as possible. This statement does not necessarily mean that the pressure should be limited to ultrahigh pressure exceeding 10,000 atmospheres specifically. It goes without saying that this invention can be effectively applied to a hot press using a working pressure on the order of several hundreds of kg/cm$^2$.

By the sintering method of this invention, the following conspicuous effects can be obtained.

1. Since the sintering can be carried out under an ultrahigh pressure at a high temperature, the high melting substances which have defied sintering by the conventional method can be be sintered compactly.

2. Since the sintering is effected quickly under an ultrahigh pressure, a sintered article is obtained in high compactness without entailing growth of crystal grains.

3. Since the sitnering has no use for any power source of a large capacity for heating and the sintering itself is completed in a short time, the thermal load exerted on the materials of the pressure vessel is small.

We claim:

1. A method for sintering a metal powder, a ceramic powder, or a mixture of a metal powder with a ceramic powder by heating said powder as held under pressure with the heat of thermit reaction.

2. A sintering method according to claim 1, which further comprises interposing a barrier made of hexagonal boron nitride and/or tantalum between the powder subjected to sintering and a Thermit composition.

3. A sintering method according to claim 1, which further comprises disposing a Thermit composition around the entire periphery of said powder subjected to sintering, heating said powder with the heat generated by the thermit reaction and, at the same time, fusing part or the whole of the product of said thermit reaction thereby hydrostatically applying pressure on said powder.

4. A sintering method according to any of claims 1 through 3, wherein said thermit composition is a mixture of iron oxide powder with aluminum powder, a mixture of iron oxide powder with silicon powder, or a mixture of iron oxide powder with aluminum powder.

5. A sintering method according to claim 1, wherein said pressure is not less than 10,000 atmospheres.

6. A sintering method according to claim 1 or claim 5, wherein said powder subjected to sintering is one member or a mixture of at least two members selected from among $TiB_2$, $ZrB_2$, and $HfB_2$, or one member or a mixture of at least two members selected from among the compounds based on said borides.

7. A sintering method according to claim 1, wherein said powder subjected to sintering has grain sizes of not more than 1 $\mu$m.

8. A sintering method according to claim 1, wherein a heat-resistant, abrasion-resistant, electroconductive, and neutrol-shielding high-density sitnered article is produced by sintering the powder of one member or a mixture of at least two members selected from among $TiB_2$, $ZrB_2$, and $HfB_2$ as held under pressure with the heat of reaction of a thermit composition.

9. A sintering method according to claim 8, wherein said pressure is not less than 10,000 atmospheres.

* * * * *